United States Patent [19]

Blomfield-Brown

[11] Patent Number: 5,274,819
[45] Date of Patent: Dec. 28, 1993

[54] MANAGEMENT SYSTEM FOR MEMORY RESIDENT COMPUTER PROGRAMS

[75] Inventor: Christopher Blomfield-Brown, Beaverton, Oreg.

[73] Assignee: Central Point Software, Inc., Beaverton, Oreg.

[21] Appl. No.: 858,678

[22] Filed: Mar. 27, 1992

[51] Int. Cl.$^5$ .................... G06F 9/30; G06F 3/153
[52] U.S. Cl. ................... 395/700; 364/DIG. 1; 364/286.3; 364/280.9; 364/239.8; 364/228.1
[58] Field of Search .................. 364/DIG. 1, DIG. 2; 395/700, 157-161

[56] References Cited

U.S. PATENT DOCUMENTS

| 4,807,142 | 2/1989 | Agarwal | 364/DIG. 1 |
| 4,827,404 | 5/1989 | Barstow et al. | 364/DIG. 1 |
| 4,939,507 | 7/1990 | Beard et al. | 364/DIG. 1 |
| 5,086,386 | 2/1992 | Islam | 364/DIG. 1 |
| 5,095,420 | 3/1992 | Eilert et al. | 364/DIG. 1 |

Primary Examiner—Thomas M. Heckler
Attorney, Agent, or Firm—Dick and Harris

[57] ABSTRACT

A management system for memory resident computer programs is disclosed which serves to provide compatibility between memory resident programs, TSR's, written for the DOS operating system and the Windows graphical user interface whereby graphical images are generated and displayed to the user running the Windows graphical user interface under the command of a DOS TSR and the user's input data may be communicated back to the DOS TSR in response to the image displayed. The present invention is comprised of a DOS TSR and a Windows TSR Manager which allocates memory addressable by both the DOS TSR and the Windows TSR Manager such that a communication channel independent of the DOS and Windows user interfaces is established and where the Windows TSR Manager further includes a Windows TSR Library Handler and one or more Windows TSR Libraries one for each DOS TSR supported by the present management system which serves to generate graphical images compatible with the Windows graphical user interface.

3 Claims, 9 Drawing Sheets

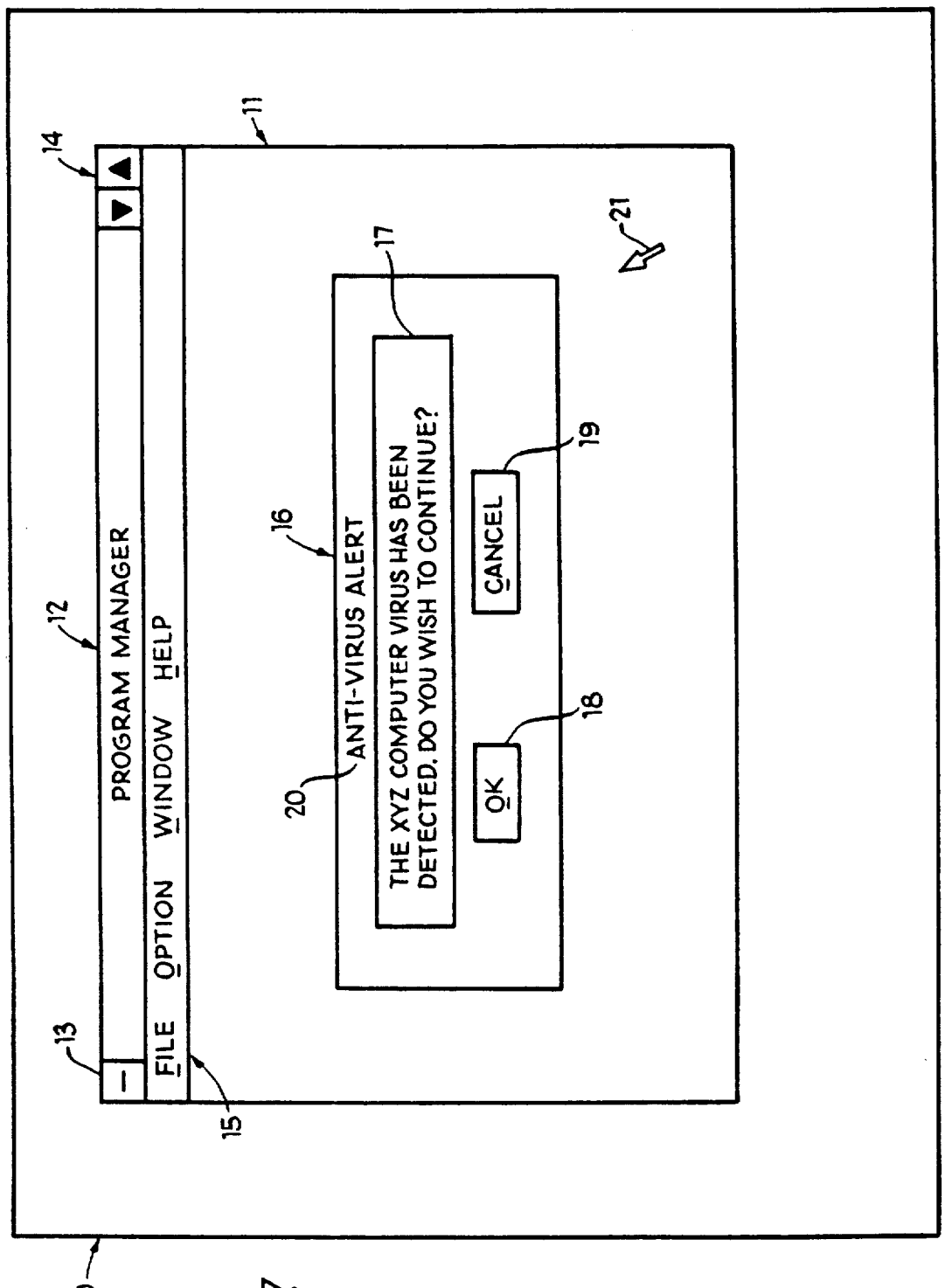

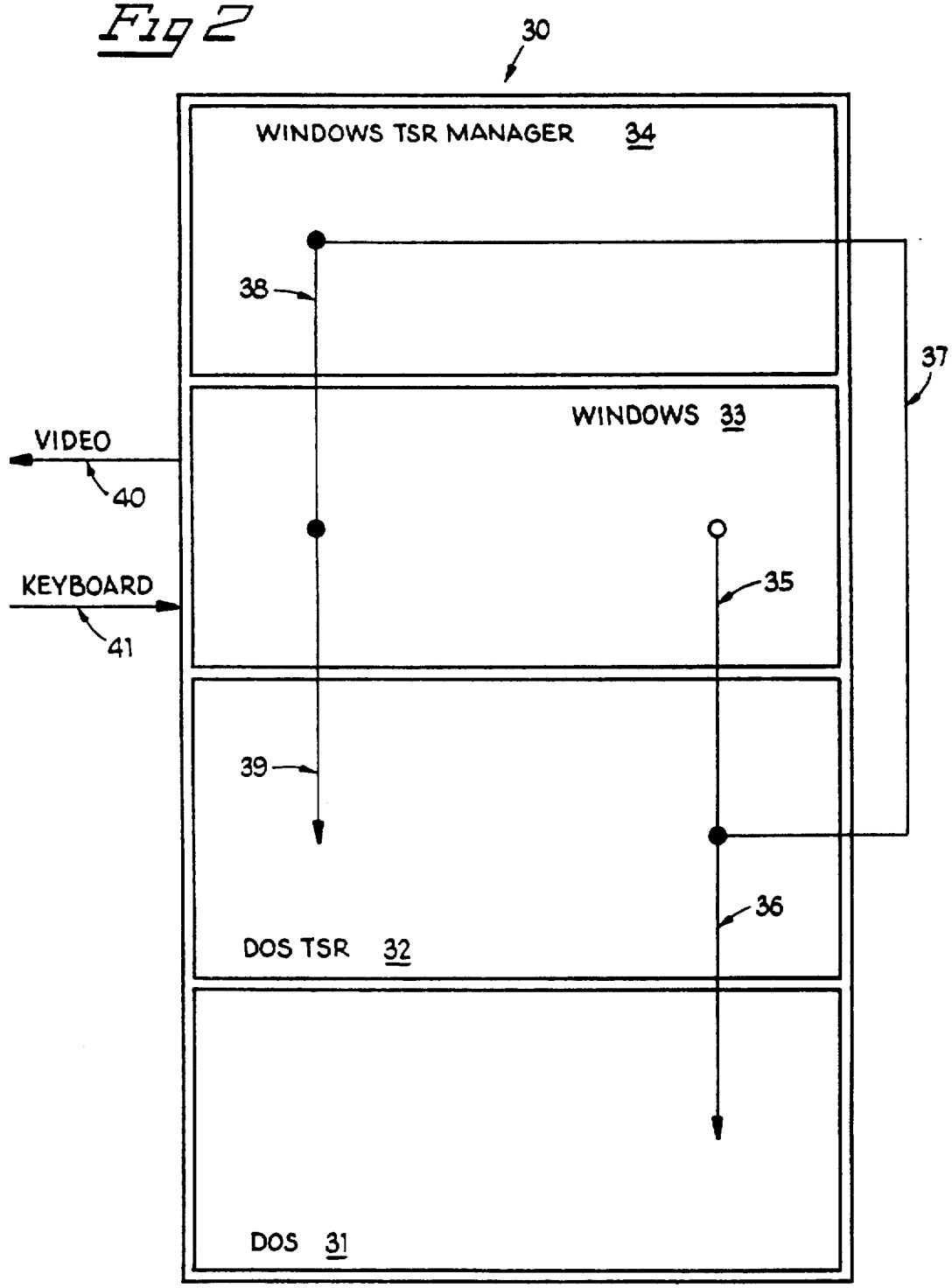

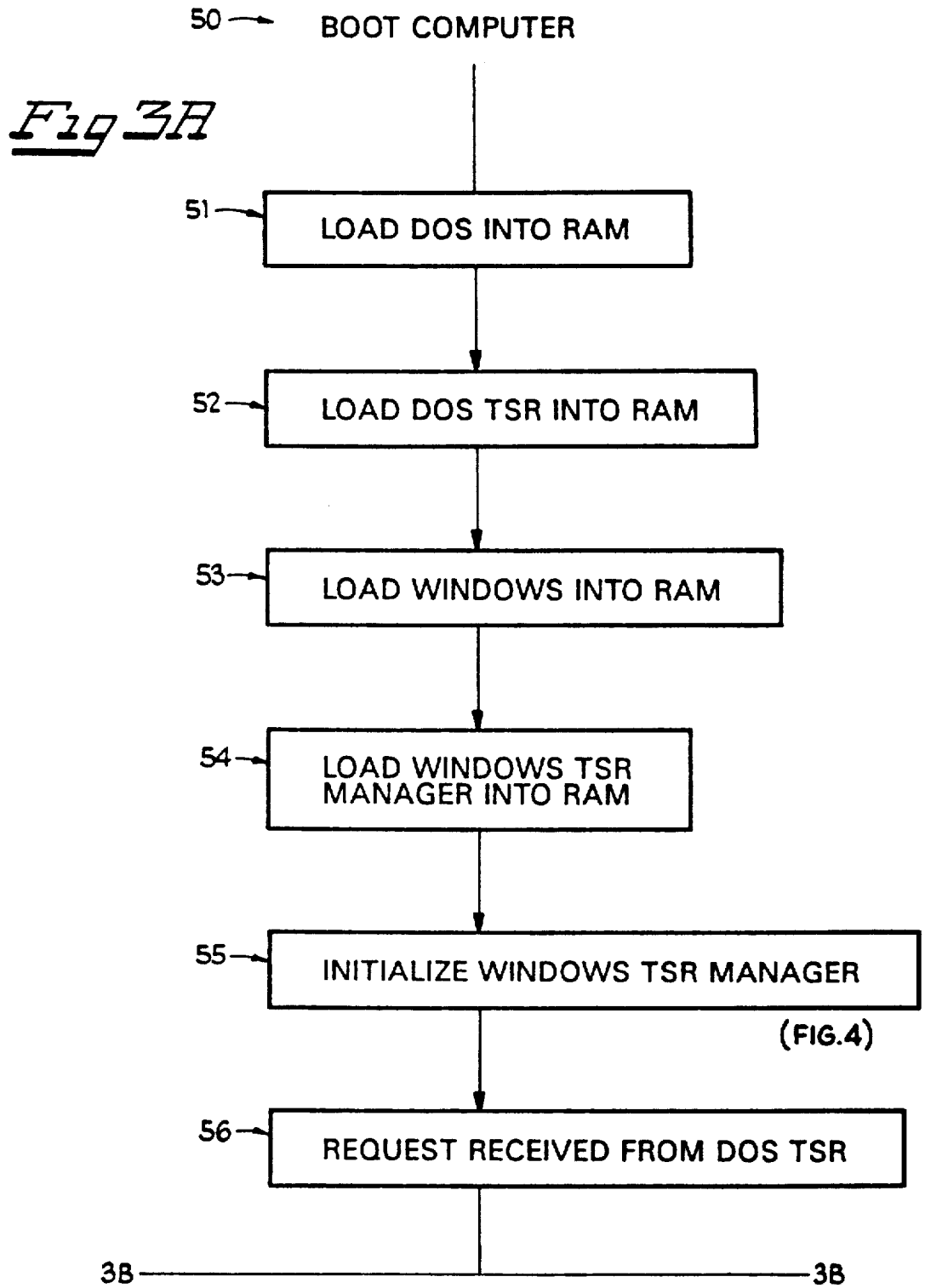

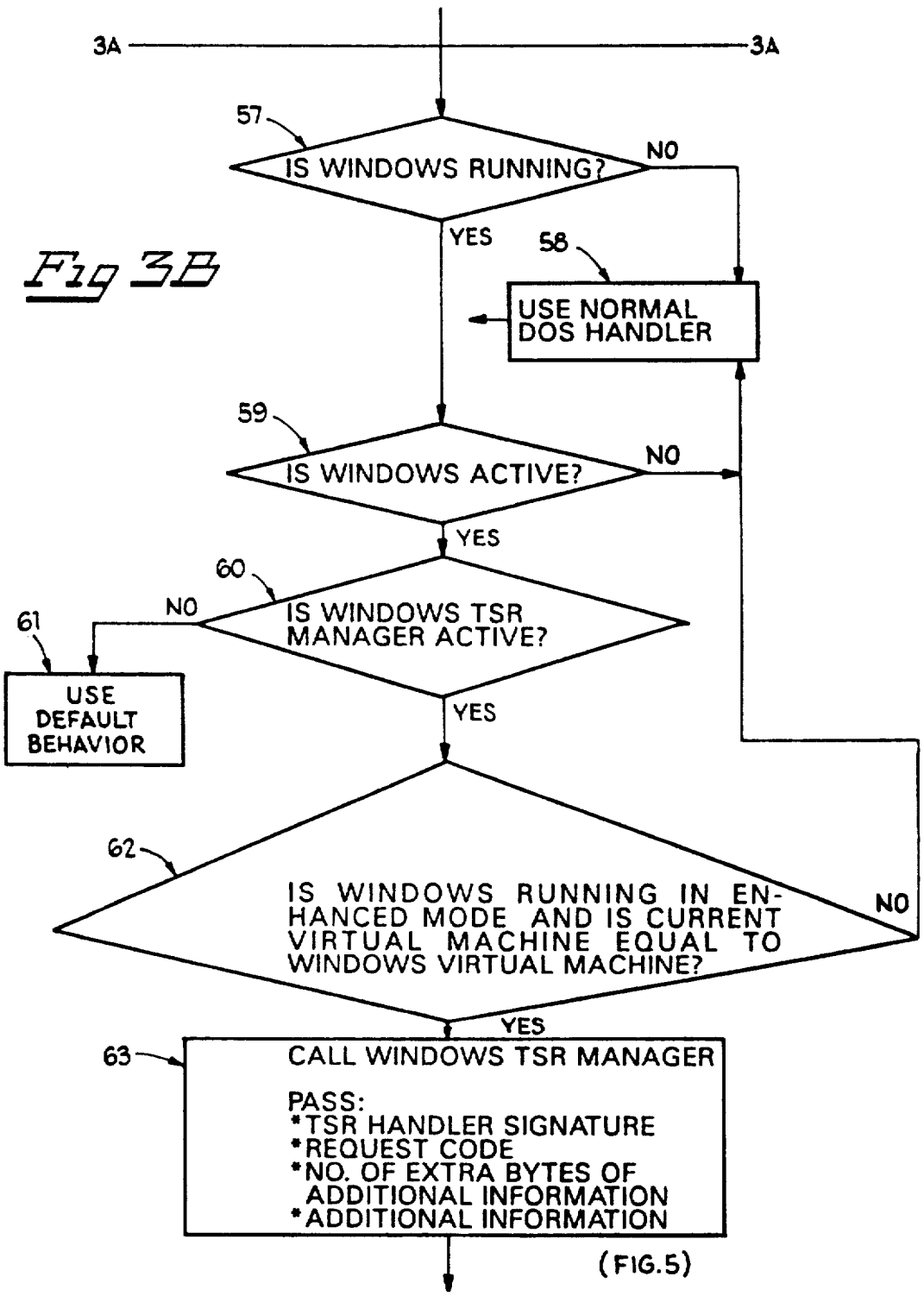

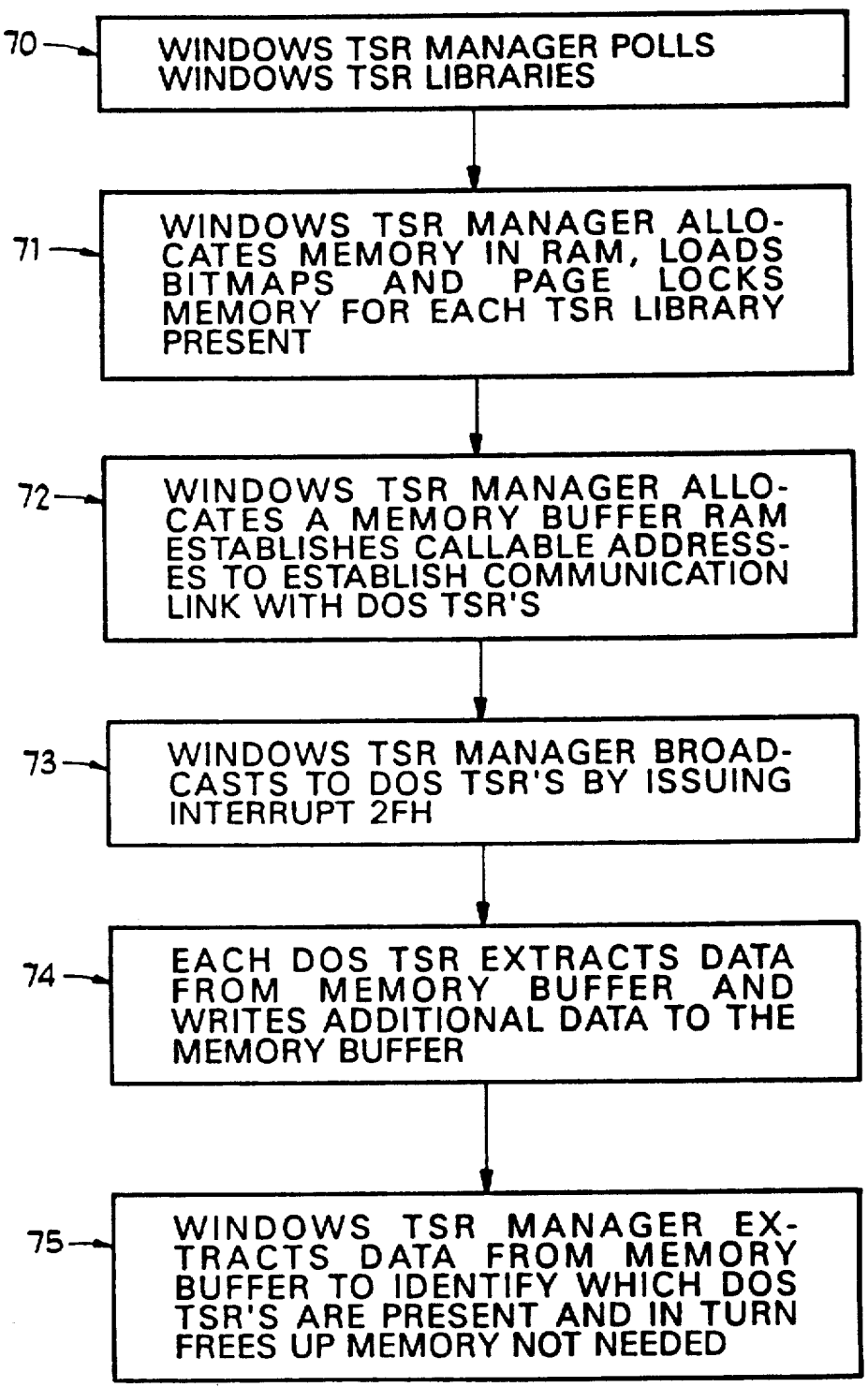

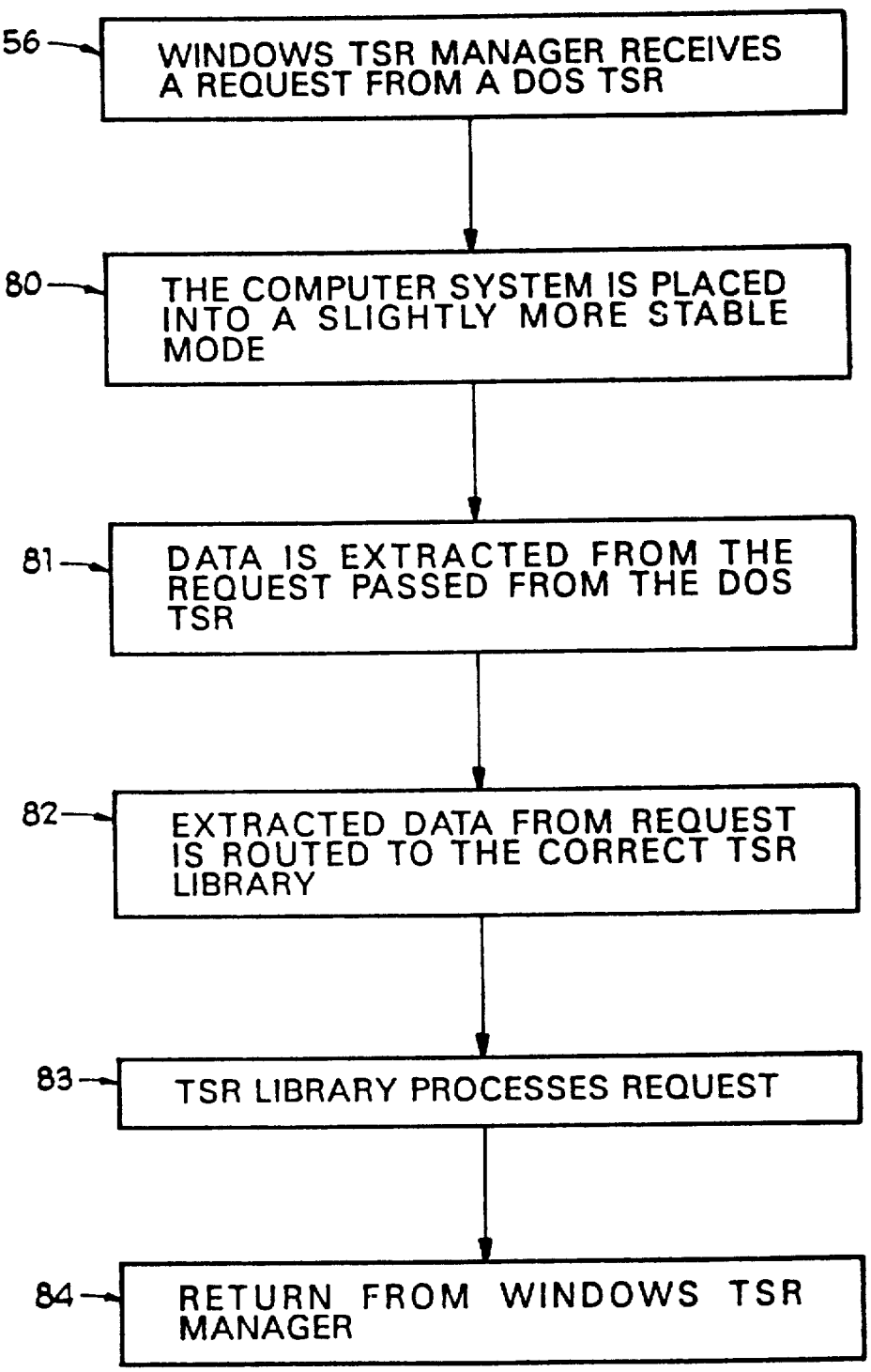

MANAGEMENT SYSTEM FOR MEMORY RESIDENT COMPUTER PROGRAMS

BACKGROUND OF THE INVENTION

The present invention relates generally to the management of Terminate and Stay Resident (TSR) Programs, otherwise known as memory resident programs, written for the MS-DOS or PC-DOS operating systems (DOS TSR) and running in the presence of the Microsoft Windows graphical user interface on an IBM or IBM compatible personal computer, and specifically, to the ability to display to the computer user in the Windows graphical user interface video images depicting dialog boxes which are prompted by a TSR program written for and running in DOS towards soliciting a user response from the user via the Windows graphical user interface and towards communicating that response to the DOS TSR or otherwise performing the requested process commanded by the DOS TSR.

IBM and IBM compatible personal computers introduced in the early 1980's as well as the majority of those computers available to the consuming public today operate using a software platform, or disk operating system, commonly referred to as DOS. The DOS operating system as viewed by the computer user is essentially an interface between the computer user and the computer itself, and is made up of a series of programs which let the computer user communicate with the computer, its data storage media, printers and accessories towards managing programs, data and the hardware elements themselves. One often mentioned shortcoming of the DOS user interface is the fact that it is a purely textual interface in that the user communicates with the computer by entering alpha-numeric commands using a typewriter style keyboard toward instructing the computer to carry out a desired operation. Many of the typewritten textual commands standard to the DOS operating system are mnemonics, abbreviations or "codes" which are cumbersome at best and non-intuitive to the average computer user. In an attempt to overcome the shortcomings of the DOS user interface, Microsoft Corporation has created and markets under the name "WINDOWS" a software program which runs "on top" of the DOS operating system much like any other application program and provides to the computer user a graphical user interface which is thought to provide a more intuitive and efficient user interface than that provided by the original and subsequent versions of the DOS system. Rather than type alpha-numeric commands the user has the option to manipulate a pointer device such as a mouse to position an arrow shaped cursor over a graphical icon depicting a command. By positioning the cursor as described and depressing a button on the mouse the user initiates the command represented by the icon, as opposed to otherwise typing the command on the keyboard. One advantage is the ability to pair icons to specific commands such that the graphical icon bears some connection or resemblance to the nature of the command executed by that icon.

While the DOS and Windows graphical user interfaces may be thought to be "compatible" with one another inasmuch as Windows "runs" on top of DOS, there are fundamental and inherent differences which render computer programs originally written for the DOS operating system incompatible with the Windows graphical user interface. One particular incompatibility which is sought to be remedied by the present invention is the inability of a memory resident program written for the DOS Operating System to generate a visual image which can be displayed to the computer user when the user is running the Windows graphical user interface. The incapability between the DOS and Windows graphical user interfaces relate, in part, to differences between the video modes and processor modes used by each of the two respective interfaces. The nature and generation of the video images displayed to the computer user on the video monitor when running the Windows graphical user interface differ from the images displayed when running the DOS user Interface and give rise to one principle source of incapability. In particular, memory resident programs, as well as general application programs, written for the DOS user Interface do not have access to the Windows graphical user interface, and specifically, the "tools" or "building blocks" which the Windows graphical user interface utilizes in generating the images appearing on the computer monitor. Moreover, memory resident programs for the DOS user Interface cannot by themselves support the video modes used by the Windows graphical user interface. If such DOS TSR's were written so as to provide support for such video modes, the mechanism to provide such support would utilize virtually all available computer memory and thus essentially disable the computer. Moreover, if the user attempts to command a DOS application program to generate images in the conventional manner when the Windows graphical user interface is running, or should a DOS TSR on its own attempt to generate a "DOS" dialog box in the normal DOS manner, the attempt may result in an unrecoverable application error and thus lock-up the computer possibly resulting in the unrecoverable loss of data.

A second basis of incapability is due to the nature of the processor modes utilized by the Windows and DOS Interfaces. The Windows graphical user interface is run only from the protected mode while memory resident programs for the DOS user interface do not function in the protected mode and must use the real mode if they are to operate.

A further distinction is that TSR programs written for the DOS user interface are typically able to easily display a dialog box to the computer user when the computer system is "stable" and in some cases is able to display a dialog box to the user when the system is "unstable" provided that the generation is performed carefully, i.e. without causing conflicts within the system that would result in a crash. During the running of a typical computer application program and the us of conventional DOS commands there are moments in time, however brief, that the computer system may be thought to be unstable due to the computer systems use of certain resources, including memory calls, such that if these resources were sought to be used simultaneously by another program or routine the computer system may "crash", again resulting in a "lock-up" and potential unrecoverable loss of data. For this reason, application program and TSR's are sometimes written such that they exercise certain commands or functions only when the computer system is "stable" and such resources are available.

A typical and useful example of a memory resident program running in the DOS operating system which is helpful in illustrating the operation and utility of the present invention is a Virus Detection Program designed to detect the presence of a computer virus before the virus is loaded into computer memory or otherwise transferred for storage on computer's data storage media, i.e. floppy disk drives, hard disk drives and the like. Typically, a Virus Detection Program operates by intercepting commands issued to either run a designated application program or otherwise open a computer data file. The virus detection program typically operates in a memory resident mode such that commands to run applications or open files may be automatically intercepted on a real time basis without intervention by the computer user. When such a command is issued it is intercepted and the Virus Detection Program becomes active scanning for the presence of a computer virus, typically in the "background" and unnoticed by the computer user. In the event that a computer virus is detected, the virus detection program causes a visual warning to be displayed to the user on the computer monitor in the form of a dialog box informing the user that a virus has been detected and requesting the user's instructions relative to ignoring the detection and proceeding normally or alternatively, blocking execution of the command to run an application or open a file whereby the application is not run and/or the file not opened. Another example of a memory resident program written for the DOS user interface include remote control programs which permit a remotely located computer to take command of the local computer such as when an employee wishes to "operate" his office computer from home in the evening. A memory resident program running on the local computer located at the workplace functions to detect an incoming telephone call initiated by the employee's home computer which when detected launches the remote control program on the workplace computer. Yet a further example of dialog box is its use in requesting the user to enter a password when a restricted command is attempted to be executed. The user would be prompted to enter a password which would in turn be verified by the DOS TSR toward permitting the commanded operation to proceed.

In view of the above described incompatibilities between the DOS and Windows user Interfaces, a Virus Detection Program incorporating a memory resident feature which while properly activated and loaded into the computer memory would nevertheless be incapable of visually notifying the user of the detection of a computer virus due to the inability of the program written for the DOS operating system to generate a visual image compatible with the Windows graphical user interface. Accordingly, the typical prior art memory resident program while being able to function to some extent is unable to interact with the user graphically and is unable to receive a response from the user entered on the computer's keyboard. In such cases the prior art Virus Detection TSR program would either operate without the user's input and assume a worst case scenario thus blocking execution of a program, or rely solely upon the retained ability to generate sound via the computer's speaker inasmuch as the audio path in the typical computer is separate from the Windows graphical user interface.

Accordingly, an object of the present invention is to provide a system to permit a memory resident program written for the DOS interface to communicate with the computer user running the Windows graphical user interface by permitting the display and generation of a dialog box viewable by the user within the Windows graphical user interface.

A further object of the present invention is to provide a system to accept user input in response to the display of a graphical dialog box towards instructing the DOS memory resident program in accordance with the user's direction.

A further object of the present invention is to provide a Management System For Memory Resident Computer Programs which operates in real time and at any time even during system "unstable" periods.

Yet a further object of the present Management System For Memory Resident Computer Programs is to permit a memory resident program written for the DOS user Interface to operate when the Windows Graphical User Interface is in use.

These and other objects of the invention will become apparent in light of the present specifications and drawings.

SUMMARY OF THE INVENTION

The present management system for memory resident computer programs serves to provide compatibility between memory resident programs, TSR's, written for the DOS operating system and the Windows graphical user interface whereby the present management system serves to intercept and process requests generated by DOS TSR's while the Windows graphical user interface is running. The present system has immediate utility and application toward generating and displaying to the user running the Windows graphical user interface an image under the command of a DOS TSR as well as to communicate back to the DOS TSR input provided by the user in response to the image displayed.

The essential operations of the present management system for memory resident computer programs are carried out principally through the cooperation of the computer system microprocessor, the computer system random access memory (RAM) and computer monitor after the system has been initialized.

The present management system for memory resident computer programs designed for use with a computer system running the DOS operating system and the Windows graphical user interface is comprised of a DOS TSR and a Windows TSR Manager. The Windows TSR Manager further includes a Windows TSR Library Handler and one or more Windows TSR Libraries where there exists a Windows TSR Library for each DOS TSR supported by the present management system.

In the DOS environment, a TSR program has the ability to communicate with the computer user by generating graphical displays viewable by the user on the computer monitor. In the case of a virus detection program, when an application program is commanded to be executed, the TSR component upon detecting the presence of a virus generates a dialog box which is superimposed over the existing display toward informing the user that a computer virus has been detected. The dialog box may further prompt the user to select between ignoring the virus or aborting the execution of the application program.

INITIALIZATION OF THE MANAGEMENT SYSTEM

Initialization of the present management system for memory resident programs takes place as follows. When the computer system is first turned on, or booted, the DOS operating system is loaded into the computer's RAM followed by any DOS TSR's. DOS TSR's may be loaded into the computer's memory automatically upon booting if the appropriate commands have been placed into either the AUTOEXEC.BAT or CONFIG.SYS files. Alternatively, they may be loaded manually by the user. After all of the DOS TSR's are loaded into RAM the Windows graphical user interface is started. The Windows graphical user interface may be loaded automatically or manually in the same manner as DOS TSR's. It is important that all DOS TSR's be loaded before the Windows graphical user interface is started since DOS TSR's cannot be loaded properly while the Windows graphical user interface is running. Each time the Windows graphical user interface is started it is detected by each of the one or more DOS TSR's which have be loaded into RAM such that they are thereafter prevented from displaying any graphical image without going through the Windows TSR Manager. The DOS TSR's also detect when a Windows graphical user interface session is terminated or a full screen DOS application is started after which the DOS TSR's may display their graphical images in the normal DOS manner. The DOS TSR's utilized by the present management system comprise the memory resident program routine originally written for the DOS operating system to which has been added routines for detecting the beginning and termination of Windows sessions as well as routines for disabling the generation of conventional DO video images and routines for passing to the Windows TSR Manager certain parameters relating to their identifying signature and their respective DOS video images.

After the Window's user interface is started the Windows TSR Manager is activated and is itself initialized, either automatically by the user having provided the appropriate command to the WIN.INI file or manually using any one of a number of methods provided by the Windows graphical user interface for running an application program.

The Windows TSR Manager described above as including a Windows TSR Library Handler and one or more Windows TSR Library routines is initialized in the same manner as any other application program written for the Windows graphical user interface by using dynamic link libraries referred to as DLL's. The Windows TSR Manager first polls each of the Windows TSR Libraries and initializes the Windows TSR Library Handler by allocating memory in RAM that is needed to service a request from a DOS TSR where the amount of memory is a function of the number and type of each Windows TSR Library supported by the Windows TSR Manager. This memory is initialized by loading bitmaps and is then page locked to insure that the memory will exist at such time as an interrupt occurs. These memory locations are "special" and not altered or swapped out to other forms of storage media. Contained within this memory is data which identifies with respect to each TSR Library which dialog boxes are to be used and the configuration of the display screen.

In the preferred embodiment of the invention there exists within the Windows TSR Manager a unique Windows TSR Library (DLL) for each DOS TSR supported by the present management system where each library is capable of causing graphical images to appear in the Windows graphical user interface mimicking the DOS TSR to which each library corresponds. In the present embodiment, a single DLL handles all DOS TSR's. In both cases, the DLL's must be fixed model DLL's.

Accordingly, when a DOS TSR issues a request requiring processing by the Windows TSR Manager the corresponding Windows TSR Library has had all necessary information previously stored in memory readily accessible to Windows TSR Manager. If a Windows TSR library attempted to load data in at attempt to process a DOS TSR request it is very likely that the computer system would "crash". Thus it is important to initialize all of the libraries first. Once the Windows TSR Manager initializes the DOS TSR's, the Windows TSR Manager becomes active. The Windows TSR Manager is thus ready to accept any request after the initialization call is made, if it were not a system crash could result.

The Windows TSR Manager thereafter requests information from each of the Windows TSR Handler Libraries and establishes "back door" using a memory address accessible to both the Windows TSR Manager and each DOS TSR such that each of the DOS TSR's may communicate "directly∞ with the Windows TSR Manager by exercising a basic non-destructive command. To set up communication with the DOS TSR's the Windows TSR Manager issues an interrupt 2Fh with a signature and register pointing to the communications buffer previously reserved in memory. Each DOS TSR extracts and saves certain values from the communication buffer and communicates certain other values to the buffer and, in turn, to the Windows TSR Manager in order to indicate to the Windows TSR Manager which DOS TSR's are present in RAM and that the correct version of DOS is in place.

The main initialization occurs when the Windows TSR Manager attempts to communicate with all known TSR's by "broadcasting" to the DOS TSR's via a memory buffer which each DOS TSR has been instructed to poll.

The Windows TSR Manager first builds a special control buffer by allocating a designated memory block in protected memory that is accessible to the DOS TSR's and from which they can read and write. The first few bytes of memory are loaded with data, a memory address, that each DOS TSR will need in order to be able to communicate back to the Windows TSR Manager and eventually the corresponding Windows TSR Library support module. Included are fields such as virtual machine identification specifying which virtual machine the Windows TSR Manager resides in, a callable DOS address which provides the back door through which the DOS TSR can "talk" to the Windows TSR Manager as well as additional fields for versioning and other miscellaneous data. The remaining portion of the buffer is used to allow the DOS TSR to notify the Windows TSR Manager that it is either present or running the wrong version of the DOS code and thus will not be active. The broadcast of this information occurs on an interrupt 2Fh All of the DOS TSR's hook this interrupt and expect to see a specific value in the AX register. When each DOS TSR's "sees" this value, they each extract and save the needed information from the Windows TSR Manager and then mark the buffer location. The mark comprises writing a "X" in "slot" allocated to the particular DOS TSR. The slot is the DOS TSR signature. Writing a "V" in that location signifies a bad version.

The manner of hooking the 2Fh interrupt chain is as follows: All DOS TSR's hook this interrupt. When that interrupt is issued the DOS TSR's look for specific signature data. They will either examine the data or ignore it. In any case when they will pass it to the next caller in the chain such that when interrupt call issued by the Windows TSR Manager returns to the Windows TSR Manager it is informed as to which DOS TSR's are present by using just on call. This element must be present in each DOS TSR for it to be able to communicate using the Windows graphical user interface. In addition, once the Windows TSR Manager knows which DOS TSR's are present and which are not, it is able to shut down the Windows TSR Libraries for those DOS TSR'S which are not active so as to free up valuable system resources, and particularly memory.

Once the Windows TSR Manager has initialized all of the DOS TSR's and the Windows TSR Libraries, the Windows TSR Manager user interface is itself initialized. The Windows TSR Manager user interface will request information from all active TSR's including TSR title, an icon to display on the buttons, a configuration dialog box handler (enable disable options, status of DOS TSR, etc.)

At this point the memory resident program management system is fully initialized and ready to respond to an event in which the Windows TSR Manager receives a "request" from a DOS TSR. In responding to a request the DOS TSR will first communicate to the Windows TSR Manager via the "back door" created by use of the communications buffer memory. The Windows TSR Manager will first command that stacks be switched so as to minimize the chance that the system will "crash". The Windows TSR Manager will then identify the DOS TSR making the request and call the appropriate WINDOWS TSR Handler.

PROCESSING DOS TSR REQUESTS

There are two types of DOS TSR requests, asynchronous and synchronous. Asynchronous requests occur when the DOS TSR needs information immediately. The DOS TSR along with the Windows TSR Manager will completely suspend the system until the request is fulfilled such as in the case when the anti-virus DOS TSR has detected a virus. In such a case all system operations are suspended until the user has indicated whether to proceed and ignore the virus or stop and abort the then pending command. These types of request can occur at any time, including during disk operations. The system can be in a very "unstable" state. Thus it is important that the Windows TSR Manager and specifically the TSR Library Handler be very careful and only work with the services and resources provided and outlined by the Windows TSR Manager so as not to "crash" the system and possibly risk a catastrophic loss of data.

Synchronous requests occur when the DOS TSR makes a request but does not need its request processed immediately. The Windows TSR Manager will not suspend the system to process the request, but will process the request when the system is more "stable". Such a request might occur when a remote control TSR receives an incoming call signaling that an external computer is attempting to take control of this computer. The DOS TSR needs the Windows TSR Manager to run a program to answer the call though it is not critical that it happens immediately for the phone can certainly ring one more time.

Examples of various requests which may be processed by the Windows TSR Manager are as follows.

Events which spawn applications are the simplest types of event. The DOS TSR merely posts a message which is received by the Windows TSR Manager which in turn spawns the application when the system is deemed stable.

An event dialog box is the type of request posed by a antivirus application. Data from the DOS TSR is passed to the Windows TSR Manager and in turn to the Windows TSR Library Handler using the memory allocated during the initialization process. Data may include a bitmapped icon, private DC, and message strings in the appropriate language. The Windows TSR Manager then draws an image which looks like a dialog box to the user but which in fact is not a true Windows dialog box for it is created without access to the Windows graphics tools. The dialog box, the buttons and indicia are merely drawn and are not true creations of the Windows graphical user interface tools set. When the user responds to the request for input solicited by the dialog box the information is passed to the DOS TSR which processes the information just as if it was received from a typical DOS session.

An event password box is a further example of a request which may be processed by the Windows TSR Manager and in fact is a superset of the event dialog box example. The Windows TSR Manager adds an pseudo edit window for a user to type in their password. Again, this is not a true edit window created using Windows graphic tools and building blocks but rather is just a box drawn by the Windows TSR Manager to look like a edit window.

When the Windows graphical user interface is running in standard mode (286 machines), DOS sessions are quite different than in the enhanced mode (386 machines). When the Windows standard mode starts a DOS session, it will swap the entire Windows session out of memory to run the DOS session as would occur when the user switches to a DOS application from within the Windows graphical user interface..

When Windows is swapped out, the call or back door that the DOS TSR has is no longer valid. Accordingly, the switch to and from the DOS session must be detected to disable and enable the Windows TSR Manager from the DOS side. To determine this switch in Windows standard mode a message hook is installed which looks for messages to any Windows type WinOldApp (DOS applications). If the message that instructs WinOldApp to start a dormant DOS application is detected the DOS TSR is notified that the Windows TSR Manager is dormant because the system is swapped into a DOS session. When messages are detected as being sent to WinOldApp the DOS TSR's are notified that the system has left the DOS session. When the Windows TSR Manager detects that the Windows graphical user interface is to be swapped out to memory (a task switch) all DOS TSR's are notified by using the 2Fh interrupt. When the Windows TSR Manager detects that the Windows graphical user interface has been swapped back into memory the Windows TSR Manager notifies the DOS TSR's that the Windows TSR Manager is again active and thus may make requests again. Of course when the system is in a DOS session, the DOS TSR's will function just as if the Windows graphical user interface were not there.

All Windows TSR Libraries that have an user interface are required to support a configure dialog. The configure dialog is brought up when a user "pushes" the button for the specific TSR. For instance, push the Anti-Virus button on the Windows main display will call a dialog handler from the library handler. The configure dialog can be as simple as just informing the user that the DOS TSR is present, to more complicated handlers to allow dynamic configuration of existing TSR's, i.e. allowing users to change what warning should be granted or not. The configure dialog must communicate with the Windows TSR Manager to either request states or be able to setup new configurations. This is typically performed through interrupts, each protocol is specific to each TSR, and there is not general setup scheme. The TSR Library handler may need to use the Windows TSR Manager's services to be able to send or receive certain data, such as pointers or strings.

BRIEF DESCRIPTION OF THE DRAWINGS

FIG. 1 of the drawings is pictorial representation of images displayed on the computer monitor wherein a Windows graphical user interface program window and a dialog box are pictured;

FIG. 2 of the drawings is a simplified block diagram of a memory map showing in particular, the elements comprising the management system for memory resident programs, including DOS operating system and the Windows graphical user interface;

FIG. 3 of the drawings is a flowchart illustrating the operation of the present management system for memory resident programs;

FIG. 4 of the drawings is a flowchart illustrating the steps comprising the initialization of the Windows TSR Manager of the present management system for memory resident programs;

FIG. 5 of the drawings is a flowchart illustrating the steps comprising the operation of the Windows TSR Manager of the present management system for memory resident programs when it has been called by a DOS TSR;

DETAILED DESCRIPTION OF THE DRAWINGS

Figure 6:
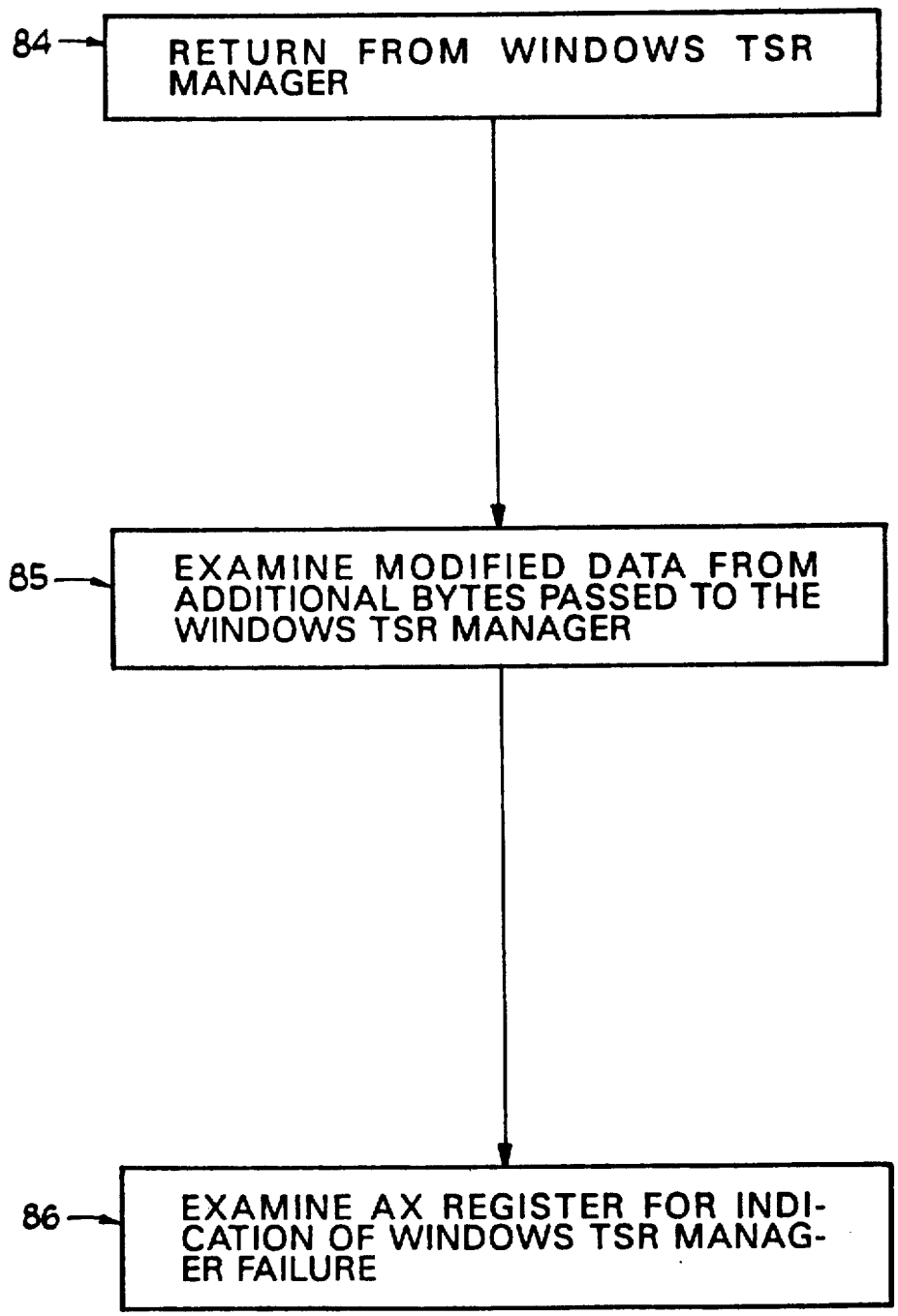
FIG. 6 of the drawings is a flowchart illustrating the steps comprising the operation of the Windows TSR Manager of the present management system for memory resident programs when it returns from a Windows TSR Manager operation initiated by a request from a DOS TSR.

While this invention is susceptible of embodiment in many different forms, one specific embodiment is shown in the drawings and will herein be described in detail with the understanding that the present disclosure is to be considered as an exemplification of the principals of the present invention and is not intended to limit the invention to the embodiment illustrated.

FIG. 1 of the drawings is pictorial representation of an image displayed on the computer monitor 10 wherein a Windows graphical user interface program window 11 and a dialog box 16 are pictured. The Windows graphical use interface pictured is the Program Manager window as designated by title bar 12. Also pictured are Program Control Menu button 13, Minimize and Maximize icons 14 and Menu Bar 15 all of which may be operated by movement of a mouse pointing device the position of which is depicted by arrow 21. Dialog box 16 is pictured superimposed over program window 11 and is shown comprising a title bar 20, description field 17 and buttons 18 and 19. The particular dialog box 16 illustrated is one which is notifying the user that a computer virus has been detected and specifically that the "XYZ" virus has been detected, as shown in field 17. Such a dialog box would be generated upon the issuance of a command to run a given application program such as would be possible through use of the Program Manager window. Field 17 further solicits the user' response as to whether the user wishes to continue, ignoring the virus warning. To continue and ignore the virus warning the user would position the mouse pointer 21 over the "OK" button 18 and "click" the mouse, or alternatively press the "0" key on the computer keyboard. To head the warning and cancel the command which prompted the virus warning the user would position the mouse pointer 21 over the "Cancel" button 19 and "click" the mouse or alternatively press the "C" key on the computer keyboard to Cancel the commanded operation. Once the user has responded to the dialog box 16 by providing either of the specified inputs dialog box 16 will disappear from the screen 10 and the commanded course of action will occur.

FIG. 2 of the drawings is a representation of the cooperation of the present invention with the DOS, memory resident DOS program and Windows program in the computer memory. The DOS user interface 31 as pictured as the foundation operating system program resident in the memory of a personal computer. A memory resident program 32, also known as a TSR program is pictured as having been loaded into memory and running "on top of" DOS 31. DOS TSR 32 is in fact a DOS application and as such is running in "real" mode. The Windows graphical user interface 33 is pictured loaded into memory and running "on top of" memory resident program 32. The Windows graphical user interface 33, and all Windows applications, including Windows TSR Manager means 34, run solely in protected mode. Pictured loaded and running "on top of" the Windows graphical user interface 33 is Windows TSR manager means 34. For purposes of illustrating the operation of the present invention, DOS TSR 32 is deemed to be a virus detection program capable of running in a memory resident mode to detect the presence of computer viruses upon loading applications or computer files into memory.

In operation, the Windows graphical user interface 33 becomes the interface through which the user interacts with the computer as symbolized by arrow 40 representing the video output from the Windows graphical user interface 33, and arrow 41 representing the user's input initiated by a keyboard or a mouse. When the user having activated the Windows graphical user interface 33 commands that an application program be run or a computer file be opened the Windows graphical user interface 33 communicates to the DOS interface 31 as symbolized by the path designated by segments 35 and 36. As illustrated, the command to either load a program or open a file is intercepted by DOS TSR 32 as symbolized by segment 35. The DOS TSR 32 having intercepted the call to DOS 31 checks the application program or file for the presence of a computer virus prior to actually loading same into the computer's memory. In the event that no computer virus is detected, the call to initiated by Windows graphical user interface 33 to DOS 31 proceeds along segment 36 and the application is run or the file opened as commanded.

In the event that a computer virus is detected, the DOS TSR 32 informs the Windows TSR Manager 34 a symbolized by segment 37. In the absence of the Windows graphical user interface 33, the DOS TSR 32 would itself generate the appropriate graphical image which would be displayed to the user via the computer monitor. Due to the incompatibilities of the DOS and Windows graphical user interfaces as described above, the DOS TSR 32 is unable to generate graphical data which can be displayed by the Windows graphical user interface 33. The DOS TSR is however able to detect the presence of a virus, identify the virus detected and communicate those two items of information to the Windows TSR Manager 34.

Windows TSR Manager 34 in turn generates the appropriate graphical display data, communicates that display data to the Windows graphical user interface 33 which in turn causes a graphical display to appear within the Windows graphical user interface 33 and be viewable to the user. In addition, the user may respond to the display by actuation of a keyboard or mouse command which is processed by the Windows graphical user interface 33 and communicated to the DOS TSR 32 as symbolized by segment 39. In the case of a virus detection program the user may, for example, elect to either allow the application or file to be loaded thus disregarding the detected virus or cancel the command to load in which case the DOS TSR 32 will fail the requested command.

In order that the system operate properly, the DOS TSR must know when the Windows graphical user interface 33 has been started and stopped. By recognizing when the Windows graphical user interface is active the DOS TSR 32 may be disabled to the extent that is does not attempt to display dialog boxes but instead is instructed to communicate with the Windows TSR Manager 34.

FIG. 3 of the drawings is a flowchart illustrating the operation of the present management system for memory resident programs. Step 50 illustrates booting the computer system after which the DOS operating system is loaded into the computer's random access memory (RAM), step 51. Thereafter any DOS TSR's are loaded into RAM, step 52 and the Windows graphical user interface is loaded into RAM, step 53. Once the Windows graphical user interface is loaded into the computer's RAM the Windows TSR Manager is loaded into RAM, step 54. As described above the loading of such elements into the computer's RAM may be accomplished either automatically or manually. Once the Windows TSR Manager has been loaded it is initialized, step 55, which process is further described in connection with FIG. 4. At this point the management system is ready to accept and process a request initiated by a DOS TSR.

When a DOS TSR is triggered it first detects whether the Windows graphical user interface is running, step 57. If the Windows graphical user interface is not running the DOS TSR will use the normal DOS handler routines residing within the DOS TSR itself and causes the desired image to be generated upon the computer monitor displaying the DOS user interface, step 58. If the Windows graphical user interface is running the DOS TSR detects whether the user interface is active, step 59. If the Windows graphical user interface is running but not active the DOS TSR will use the normal DOS handler routines residing within the DOS TSR itself to cause the desired image to be generated upon the computer monitor displaying the DOS user interface, step 58. If the Windows graphical user interface is running and is active the DOS TSR will detect whether the Windows TSR Manager is active, step 60. If it is not active the DOS TSR will merely follow its default behavior, step 61, and act without any intervention by the user since no attempt can be made to display a visual image to the user.

If the Windows TSR Manager is detected as being active the DOS TSR will detect whether the Windows graphical user interface is running in the enhanced mode and if the current virtual machine is equal to the Windows virtual machine, step 62. If the current virtual machine is not the Windows virtual machine the DOS TSR will use the normal DOS handler routines residing within the DOS TSR itself to cause the desired image to be generated upon the computer monitor displaying the DOS user interface, step 58. If the two virtual machines are detected as equal the Windows TSR manager will be called and activated, step 63. In activating the Windows TSR Manager the DOS TSR will pass certain data, namely, a Windows TSR handler signature, a request code, the number of extra bytes of additional information being passed and any additional information.

When the call to the Windows TSR Manager is returned, the DOS TSR can examine the modified data from the additional bytes that were passed to the Windows TSR Manager, step 64. In addition, the DOS TSR will also receive a response value in the AX register. The Windows TSR Manager reserves some of the response values for the AX register to indicate to the DOS TSR originating the request that the Windows TSR Manager failed the operation on its own directive.

FIG. 4 of the drawings is a flowchart illustrating the steps comprising the initialization of the Windows TSR Manager of the present management system for memory resident programs. The Windows TSR Manager will request information from each of the Windows TSR Libraries supported by the Windows TSR Manager, step 70. Based upon the number of Windows TSR Libraries which exist and the variables pertaining to each such as the appropriate icon, the Windows TSR Manager will allocate memory in RAM and will pre-load certain data into that memory by loading bitmaps, step 71. This memory is then page locked to insure that it will be present with the pre-loaded data when called upon by the Windows TSR Manager. If the Windows TSR Manager were to attempt to load any data while processing a DOS TSR request it is likely that the computer system would crash. Accordingly, all necessary data and "resources" are pre-loaded into memory which is accessible to Windows TSR Manager at any point in time such that accessing the memory will not disturb or crash the system.

The Windows TSR Manager thereafter allocates a memory buffer in RAM and establishes memory addresses which are callable by both the Windows TSR Manager and each DOS TSR such that a communications link is created, as illustrated by step 72. By using a series of memory spaces accessible to both the Windows TSR Manager and each DOS TSR the two can pass data back and forth without utilizing any resources of either the DOS operating system or the Windows graphical user interface thus overcoming the inherent incompatibility between DOS and the Windows graphical user interface. The Windows TSR Manager in addition to allocating a memory buffer will load certain bytes into that memory including virtual machine identification, a callable DOS address, versioning and other miscellaneous data. The balance of the memory buffer is used by the DOS TSR's to pass data to the Windows TSR Manager indicating that it is present or that an incompatible DOS version exists and thus will be inactive.

The Windows TSR Manager will then "broadcast" to each DOS TSR the information contained in the memory buffer on an interrupt 2Fh, step 73. Each DOS TSR will hook this interrupt and if a DOS TSR finds its designated signature data it will extract a specific value from the AX register. In either case a DOS TSR will pass the data onto the next caller in the chain. If the proper value is found each DOS TSR will extract further information from the memory buffer including the callable address through which a DOS TSR can pass information to the Windows TSR Manager. Each DOS TSR will also mark the AX register signifying that the DOS TSR is present. Accordingly, after the Windows TSR Manager issues an interrupt when the call returns to the Windows TSR Manager having been passed from DOS TSR to DOS TSR the Windows TSR Manager will know which DOS TSR's are present, step 75. Based upon which DOS TSR's do not report as being present or report having incompatible DOS versions the Windows TSR Manager will free up those portions of the memory buffer reserved to the Windows TSR Libraries corresponding to the missing DOS TSR's so to not reserve system memory unnecessarily. At this point the management system is ready to receive and process requests the DOS TSR's.

FIG. 5 of the drawings is a flowchart illustrating the steps comprising the operation of the Windows TSR Manager of the present management system for memory resident programs when it has been called by a DOS TSR. DOS TSR's by design reside in the computer system memory and wait for a triggering event that they must handle. In the case of a virus detection, the event is the command to launch an application or open a data file. The Windows TSR Manager is thus awakened by receiving a call from a DOS TSR, step 56. The Windows TSR Manager will, in effect, place the computer system into what is essentially a stable state by switching stacks in order to minimize crashing the system while performing its operations. The Windows TSR Manager will switch to a new and specific memory stack that is owned exclusively by the Windows TSR Library Handler and will extract and convert data passed from the DOS TSR into a form usable by the Windows TSR Library Handler, steps 80 and 81. Once the data is extracted from the DOS TSR which contacted the Windows TSR Manager it will route the data to the proper Windows TSR Library Handler which processes the request, step 82.

Since there is a specific Windows TSR Library for each DOS TSR supported by the present management system only a specific Windows TSR Library can handle any given request. The Windows TSR Library Handler is limited in the functions it may call in order that it does not crash the computer system. Functions beyond the minimum required by the Windows TSR Library Handler are performed by the Windows TSR Manager itself. The basic functions include memory management, dialog interfacing and request registering. When the Windows TSR Library handler needs to read data, send data to a DOS TSR or allocate special memory, it utilizes functions provided by the Windows TSR Manager. This includes memory needed to be allocated upon initialization of the management system. The Windows TSR Manager provides some simple dialog interfaces including simple text with fixed button configurations. Also provided is a password dialog. These dialogs work quite similar to the standard dialog box handler found in the Windows graphical user interface. Additionally, a request posed by a DOS TSR that does not need to be handled immediately may use a function provided by the Windows TSR Manager to register a call back request when the computer system is deemed to be in a more stable state.

FIG. 6 of the drawings is a flowchart illustrating the steps comprising the operation of the Windows TSR Manage of the present management system for memory resident programs when it returns from a Windows TSR Manager operation initiated by a request from a DOS TSR. Upon returning from the Windows TSR Manager, step 84, the memory buffer is examined by the DOS TSR to locate data which may have been modified by the Windows TSR Manager, step 85. An example of such data may be the input provided by the user in response to being asked whether to continue or cancel an operation in view of the detection of a computer virus, or the input provided by the user when asked for a password. Lastly the AX register is examined for an indication that the Windows TSR Manager has failed to process the request initiated by the DOS TSR.

Figure 7:
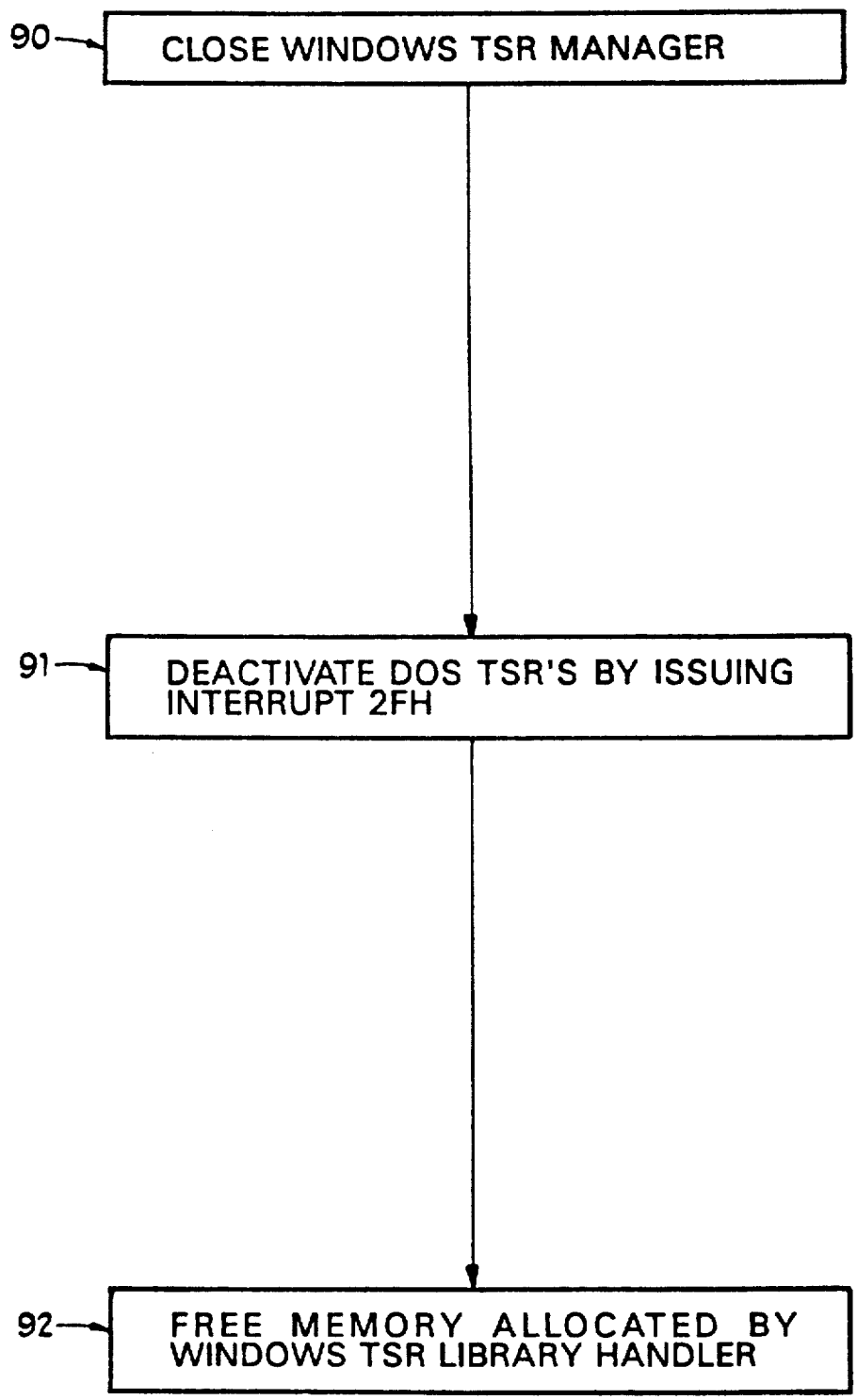
FIG. 7 of the drawings is a flowchart illustrating the steps comprising the operation of the Windows TSR Manager of the present management system for memory resident programs when the Windows TSR Manager is closed.

FIG. 7 of the drawings is a flowchart illustrating the steps comprising the operation of the Windows TSR Manager of the present management system for memory resident programs when the Windows TSR Manager is closed. In order to maintain integrity of the computer system the Windows TSR Manager must perform a few operations when it is closed, such as when the user exits the Windows graphical user interface, or when it is explicitly shut down by the user, step 90. The Windows TSR Manager will notify the DOS TSR's that the services of the Windows TSR Manager are no longer available by issuing an interrupt 2Fh, step 91, such that the DOS TSR's recognize that the Windows graphical user interface is deactivated and that they reset themselves to perform normally as they would under the DOS operating system. After the DOS TSR's have been deactivated, the Windows TSR Library Handler is deactivated such that memory is freed up to the extent that it was allocated and reserved during initialization, step 92.

Figure 8:
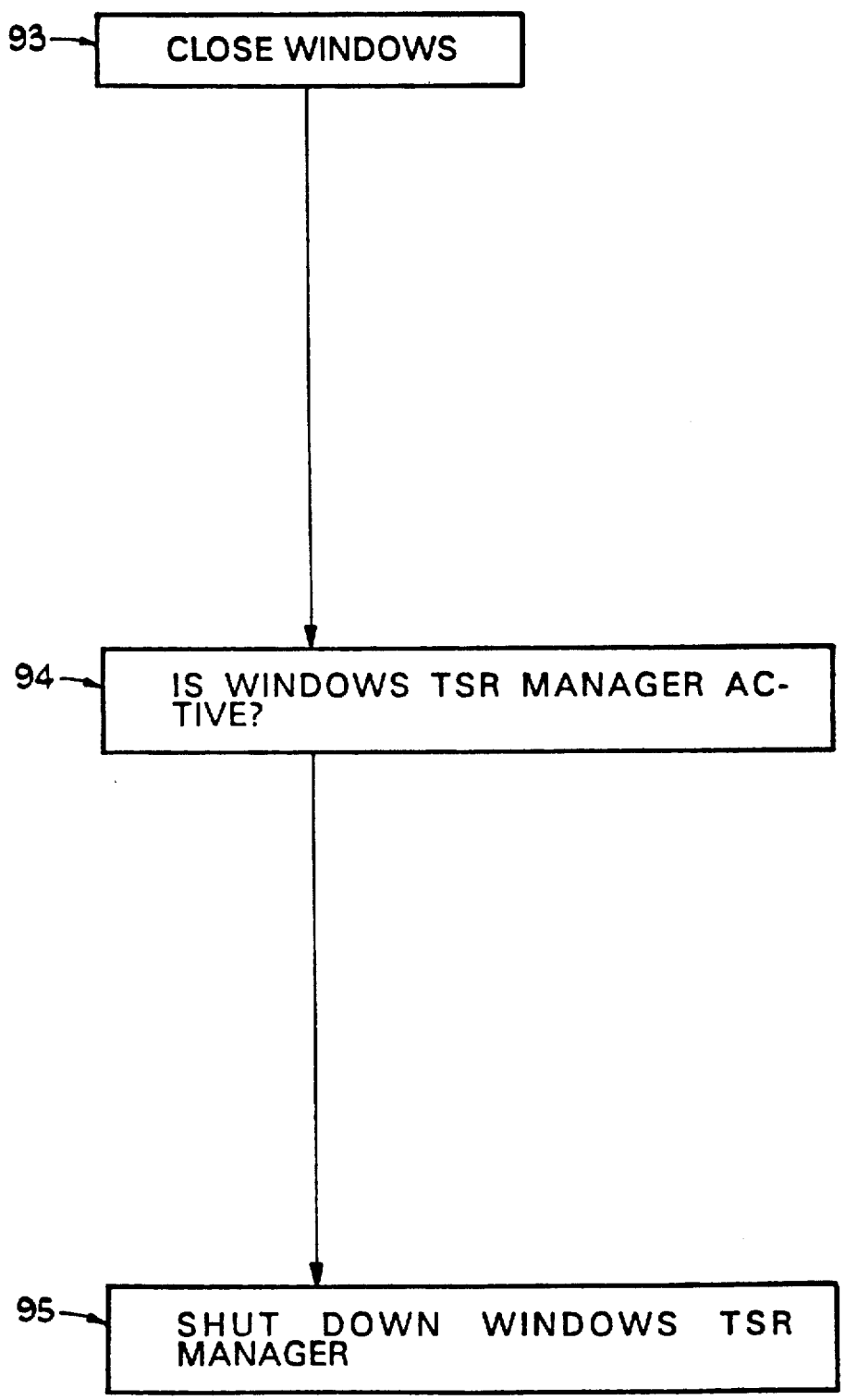
FIG. 8 of the drawings is a flowchart illustrating the steps comprising the operation of the Windows TSR Manager of the present management system for memory resident programs when the Windows graphical user interface is closed.

FIG. 8 of the drawings is a flowchart illustrating the steps comprising the operation of the Windows TSR Manager of the present management system for memory resident programs when the Windows graphical user interface is closed. Upon initiation of a command to close the Windows graphical user interface, step 93, the Windows graphical user interface will determine if the Windows TSR Manager is active, step 94 and if active will close the Windows TSR Manager using the Windows normal close operation, step 95, and the Windows graphical user interface will itself shut down. Independently, the DOS TSR's will detect that the Windows graphical user interface is being shut down, in the same manner that they detected the Windows session starting. The Windows TSR Manager is always closed before the Windows session itself is exited.

What is claimed is:

1. A management system for memory resident computer programs which serves to provide compatibility between one or more "terminate and stay resident" memory resident programs stored in a computer system's random access memory, TSR's, written for the DOS operating system and the Windows graphical user interface, wherein graphical images in the form of dialog boxes which are otherwise commanded by each of said one or more DOS TSR programs to be displayed to a user on the computer system monitor are generated and displayed to the user running the Windows graphical user interface by the present management system for memory resident computer programs, the present management system for memory resident computer programs comprising:

Windows TSR Manager means, said Windows TSR Manager means being loaded into said computer, system's random access memory and serving to accept from each of said one or more DOS TSR programs a request to generate a graphical image upon a computer monitor of a computer system running said Windows graphical user interface;

said Windows TSR Manager means further including one or more Windows TSR Library means, wherein each of said one or more Windows TSR Library means is associated with a unique DOS TSR program supported by the present management system, and wherein each of said one or more Windows TSR Library means contains the image data required to generate said graphical images upon a computer monitor of a computer system running said Windows graphical user interface;

said Windows TSR Manager means further including a Windows TSR Library Handler means, said Windows TSR Library Handler means serving under the control of said Windows TSR Manager means to associate each said request from said one or more DOS TSR programs with their corresponding Windows TSR Library means towards permitting said Windows TSR Manager means to generate a graphical image on said computer monitor which is compatible with and thus viewable within said Windows graphical user interface.

2. A method for managing memory resident computer programs in a manner which serves to provide compatibility between one or more "terminate and stay resident" memory resident programs stored in a computer system's random access memory, TSR's, written for the DOS operating system and the Windows graphical user interface, wherein graphical images in the form of dialog boxes which are otherwise commanded by each of said one or more DOS TSR programs to be displayed to the user on the computer system monitor are generated and displayed to the user running the Windows graphical user interface using the present method for managing memory resident computer programs, the present method for managing memory resident computer programs comprising the steps of:

initializing a Windows TSR Manager means by identifying which of said one or more DOS TSR programs have been loaded into the random access memory of said computer system and establishing a communication path between said Windows TSR Manager means and each of said one or more DOS TSR programs by allocating a memory buffer means within said random access memory of said computer system which is accessible to both said Windows TSR Manager means and each of said one or more DOS TSR programs;

disabling each of said one or more DOS TSR programs from generating textual images displayable within the DOS operating system while preserving the ability of each of said one or more DOS TSR programs to generate said request to display said graphical images and the data inherent in said images;

receiving a request generated by each of said one or more DOS TSR programs to display said graphical images and communicating said request and image data to said Windows TSR Manager means via said computer memory buffer;

generating a graphic image upon the command of each of said one or more DOS TSR programs which is compatible with and displayable upon said computer monitor viewable by the computer user running the Windows graphical user interface.

3. A method for managing memory resident computer programs which serves to provide compatibility between one or more "terminate and stay resident" memory resident programs, TSR's, written for the DOS operating system and the Windows graphical user interface such that graphical images are generated and displayed to the user running the Windows graphical user interface under the command of a DOS TSR, the present method for managing memory resident computer programs comprising the steps of:

identifying each of said one or more DOS TSR program means which have been loaded into the random access memory of a computer system, said identification occurring under the control of a Windows TSR Manager means;

allocating a first computer memory space for each DOS TSR to be supported by said Windows TSR Manager means;

loading data into said first computer memory space wherein said data is representative of the visual image to be displayed upon a computer monitor;

page locking said computer memory space toward insuring that the data stored in said memory is not swapped out to other data storage areas;

allocating a second computer memory space for each of said one or more DOS TSR program means which have been loaded into said random access memory means of said computer system;

designating an address within said second computer memory space which may be accessed by each of said DOS TSR programs and said Windows TSR Manager means;

commanding each of said DOS TSR program means to extract data from said second computer memory space corresponding to said memory address designated for each of said DOS TSR programs and to write data into said second computer memory space where said data serves to identify each of said one or more DOS TSR programs loaded into said random access memory means of said computer system;

determining the identify of which of said one or more DOS TSR programs have been loaded into said random access memory means by extracting said data written into said second memory buffer, said determination occurring under the control of said Windows TSR Manager means;

disabling each of said one or more DOS TSR programs from generating textual images displayable within the DOS operating system while preserving the ability of each of said one or more DOS TSR programs to generate said request to display said graphical images and the data inherent in said images;

receiving a request generated by each of said one or more DOS TSR programs to display said images and communicating said request and image data to said Windows TSR Manager means via said computer memory buffer;

generating a graphic image upon the command of each of said one or more DOS TSR programs which is displayable and viewable by the computer user running the Windows graphical user interface.

* * * * *

UNITED STATES PATENT AND TRADEMARK OFFICE
CERTIFICATE OF CORRECTION

PATENT NO. : 5,274,819

DATED : December 28, 1993

INVENTOR(S) : Blomfield-Brown

It is certified that error appears in the above-indentified patent and that said Letters Patent is hereby corrected as shown below:

| | |
|---|---|
| Col. 2, line 52 | Delete "us" and insert instead -- use --. |
| Col. 5, line 17 | Delete "be" and insert instead -- been --. |
| Col. 5, line 30 | Delete "DO" and insert instead -- DOS --. |
| Col. 5, line 58 | After "identifies" insert -- -- --. |
| Col. 5, line 59 | After "library" insert -- -- --. |
| Col. 6, line 8 | Delete "at" and insert instead -- an --. |
| Col. 6, line 22 | Delete ""directlyoo" and insert instead -- "directly" --. |
| Col. 6, line 58 | After "2Fh" insert -- . --. |
| Col. 7, line 7 | Delete "on" and insert instead -- one --. |
| Col. 7, line 13 | Delete "TSR'S" and insert instead -- TSR's --. |
| Col. 7, line 22 | After "etc.)" insert -- . --. |
| Col. 7, line 34 | Delete "WINDOWS" and insert instead -- Windows --. |
| Col. 8, line 6 | Delete "a" and insert instead -- an --. |
| Col 8, line 26 | Delete "an" and insert instead -- a --. |
| Col. 8, line 30 | Delete "a" and insert instead -- an --. |
| Col. 8, line 39 | Delete ".." and insert instead -- . --. |
| Col. 8, line 65 | Delete "an" and insert instead -- a --. |
| Col. 9, line 11 | Delete "not" and insert instead -- no --. |
| Col. 10, line 1 | Delete "use" and insert instead -- user --. |
| Col. 10, line 17 | Delete "user'" and insert instead -- user's --. |
| Col. 10, line 22 | Delete "head" and insert instead -- heed --. |
| Col. 10, line 35 | Delete "as" and insert instead -- is --. |

UNITED STATES PATENT AND TRADEMARK OFFICE
CERTIFICATE OF CORRECTION

PATENT NO. : 5,274,819

DATED : December 28, 1993

INVENTOR(S) : Blomfield-Brown

It is certified that error appears in the above-indentified patent and that said Letters Patent is hereby corrected as shown below:

Col. 11, line 9    Delete "a" and insert instead -- as --.
Col. 11, line 41   Delete "is" and insert instead -- it --.
Col. 14, line 22   Delete "Manage" and insert instead -- Manager --.
Col. 15, line 21   Delete "computer," and insert instead -- computer --.
Col. 16, line 65   Delete "identify" and insert instead -- identity --.

Signed and Sealed this

Ninth Day of May, 1995

Attest:

BRUCE LEHMAN

Attesting Officer    Commissioner of Patents and Trademarks